United States Patent
Coleman

(10) Patent No.: US 9,469,238 B1
(45) Date of Patent: Oct. 18, 2016

(54) LOAD RESTRAINT DEVICE

(71) Applicant: Douglas A. Coleman, Hubbard, OR (US)

(72) Inventor: Douglas A. Coleman, Hubbard, OR (US)

( * ) Notice: Subject to any disclaimer, the term of this patent is extended or adjusted under 35 U.S.C. 154(b) by 0 days.

(21) Appl. No.: 14/607,331

(22) Filed: Jan. 28, 2015

(51) Int. Cl.
*B60P 7/06* (2006.01)
*B60P 7/08* (2006.01)
*B65D 71/04* (2006.01)

(52) U.S. Cl.
CPC ........... *B60P 7/0823* (2013.01); *B60P 7/0869* (2013.01); *B65D 71/04* (2013.01); *Y10T 24/2175* (2015.01)

(58) Field of Classification Search
CPC .............. B60P 7/0823; B60P 7/0869; B60R 16/0215; B60R 9/10; B60R 9/12; B60R 9/00; B65D 71/04; F16G 11/00; Y10T 24/2175
USPC ............................................. 410/99; 206/453
See application file for complete search history.

(56) References Cited

U.S. PATENT DOCUMENTS

| | | | |
|---|---|---|---|
| 3,960,091 A | 6/1976 | Ehlert | |
| 4,011,974 A | 3/1977 | Scarola | |
| 5,226,764 A * | 7/1993 | Meriwether | B60P 7/0869 206/453 |
| 5,273,382 A | 12/1993 | Yearick | |
| 5,351,372 A | 10/1994 | Ihara | |
| 5,762,455 A | 6/1998 | Long | |
| 5,911,369 A | 6/1999 | Yamazaki | |
| 6,109,844 A | 8/2000 | Nadherny et al. | |
| 6,317,936 B1 | 11/2001 | McDaid et al. | |
| 8,182,181 B2 | 5/2012 | Coleman | |
| 8,540,467 B2 | 9/2013 | Coleman | |
| 2002/0148080 A1 | 10/2002 | Sonju | |

* cited by examiner

*Primary Examiner* — Robert J Sandy
*Assistant Examiner* — Michael Lee
(74) *Attorney, Agent, or Firm* — Timothy E. Siegel Patent Law, PLLC; Timothy E. Siegel

(57) ABSTRACT

A load restraint device including a base plate having a center and a first wing and a second wing extending outwardly from the center, at about a right angle from each other, with the wings defining a space between the wings. Also, a central pin is rigidly attached to the center of the base and extends outwardly in direction perpendicular to the base plate, and has a rounded surface, facing away from the space between the wings. Further, a first side pin is attached to the first wing and a second side pin attached to the second wing, with the side pins extending parallel to the central pin. Finally, an end plate is rigidly attached to the central pin and has two end plate wings, defining a space between, that is aligned to the space between the wings, the end plate being parallel to the base plate.

15 Claims, 3 Drawing Sheets

LOAD RESTRAINT DEVICE

BACKGROUND

Tying down a load in a vehicle, although it may seem mundane to some, is very important to the proper functioning of society. A load loosed upon a highway is a great danger to motorists, and many serious injuries and deaths have resulted in a load loosed from a leading vehicle flying through the windshield of a following vehicle. Even if a load is loosed upon a highway in one out of every million hauling trips, this still represents too high of a danger to those traveling by road. As of the time of filing of this application, several attorneys across the country specialize in law suits concerning loosed loads, thereby showing that this is an all too frequent and damaging occurrence.

One issue facing those who must tie down loads is avoiding the situation where a sharp corner of a tied down item results in a sawing action on a rope or strap, thereby potentially weakening the strap to the point where it fails on that hauling run, or a subsequent run. Another issue is assuring that the load is tied down with sufficient tautness and force that it will not work its way free. If there is an element of the load that could be engaged, such as a handle, it is helpful to engage such an element so that the load is positively retained and cannot under any circumstances work its way free.

Although there are many known corner protector devices, they are generally directed to protecting the goods being transported from damage from a strap in a specific environment (e.g. hauling lumber by train), rather than protecting the strap from damage from the goods. This means that for loads of materials that are very hard, such as steel plate, there is no device that is itself strong enough to be used to protect the strap from damage and that is also easy to place at the correct point, and can also be used for other tie-down tasks.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a load restraint device including a base plate having a center and a first wing and a second wing extending outwardly from the center, at about a right angle from each other, with the wings defining a space between the wings. Also, a central pin is rigidly attached to the center of the base and extends outwardly in direction perpendicular to the base plate, and has a rounded surface, facing away from the space between the wings. Further, a first side pin is attached to the first wing and a second side pin attached to the second wing, with the side pins extending parallel to the central pin. Finally, an end plate is rigidly attached to the central pin and has two end plate wings, defining a space between, that is aligned to the space between the wings, the end plate being parallel to the base plate. A user can place this device on a load and can thread a strap so that it extends between the load and the side pins, and over the central pin so that the central pin is between the strap and the load, thereby retaining the load while the strap contacts only rounded surfaces.

In a second separate aspect, the present invention may take the form of a method of restraining a load that makes use of a load restraint that includes a base plate having a center and a first wing and a second wing extending outwardly from the center, at about a right angle from each other, the wings defining a space between the wings, and a central pin, rigidly attached to the center of the base and extending outwardly in direction perpendicular to the base plate, and having a rounded surface, facing away from the space between the wings. Also, a first side pin is attached to the first wing and a second side pin is attached to the second wing, the side pins extending parallel to the central pin and each having a rounded portion facing the space between the wings. Further, an end plate has a center rigidly attached to the central pin and two end plate wings, defining a space between the end plate wings, that is aligned to the space between the wings but smaller, because the end plate wings are abbreviated compared to the base plate wings, the end plate being parallel to the base plate. To practice the method, the load restraint is placed on the load and a tension member is threaded through the pins so that the tension member extends between the side pins and the load and over the center pin, so that the center pin is between the tension member and the load.

In addition to the exemplary aspects and embodiments described above, further aspects and embodiments will become apparent by reference to the drawings and by study of the following detailed descriptions.

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

Figure 1A:
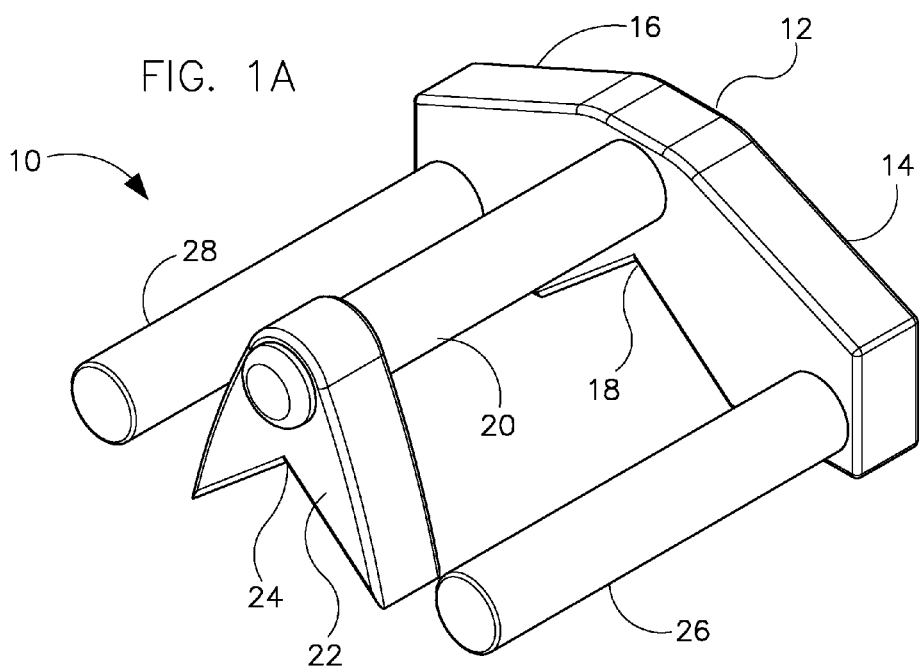
FIG. 1A is a top-side perspective view of a load restraint device, according to the present invention.
Figure 1B:
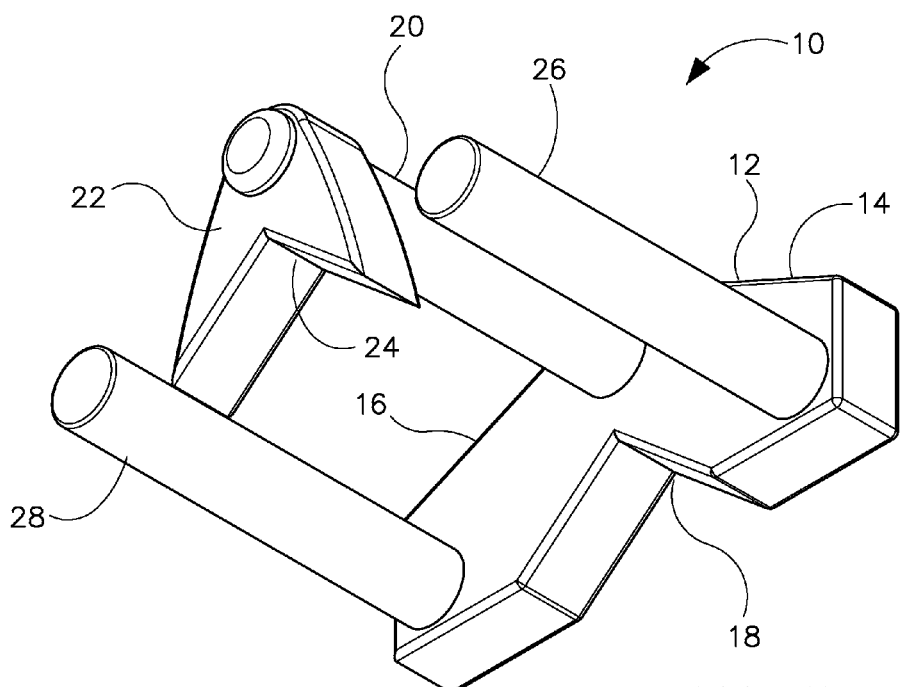
FIG. 1B is a bottom-side perspective of the device of FIG. 1A.

Referring to FIGS. 1A and 1B, in a preferred embodiment, a shift restraint device 10, includes a base plate 12 that includes a first wing 14 and a second wing 16, together defining a 90° interior corner 18. A central pin 20 is supported by base plate 12, and at the end opposite to base plate supports an end piece 22, which defines an interior corner 24, aligned with corner 18. Finally, a first side pin 26 is supported by first wing 14 and a second side pin 28 is supported by second wing 16. In an alternative preferred embodiment, side pins 26 and 28 each support end pieces.

Figure 2:
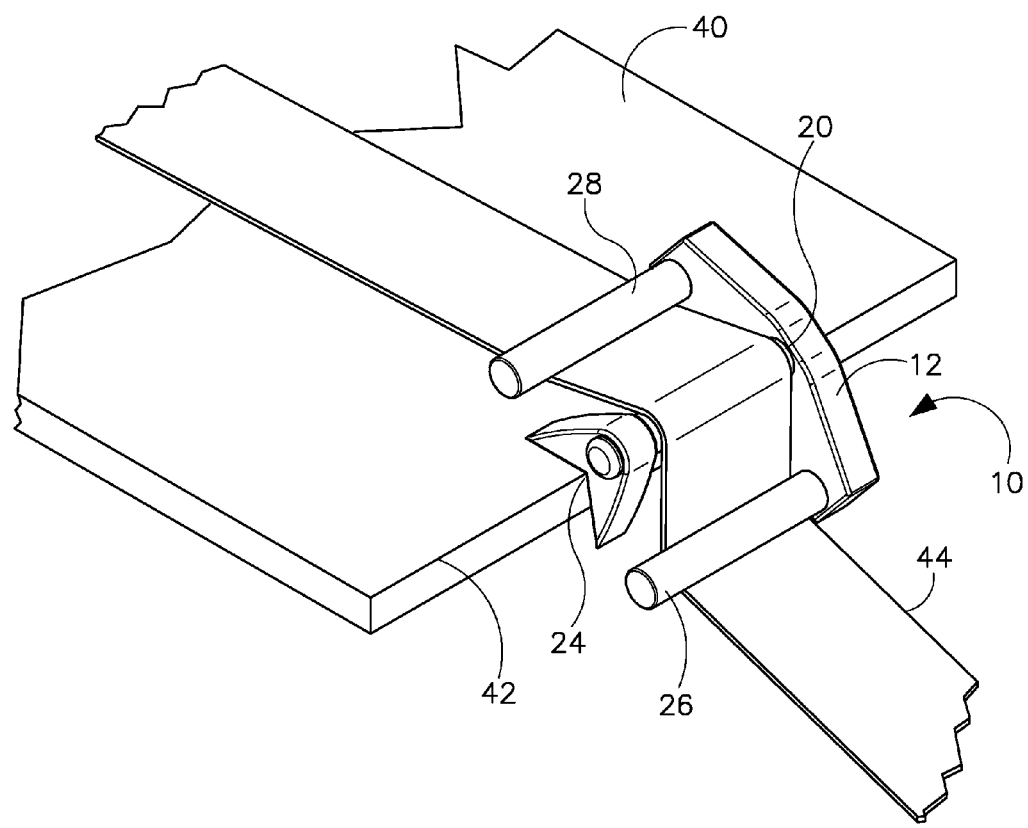
FIG. 2 is a perspective view of the device of FIG. 1A, being used to restrain a load having sharp corners.

Referring to FIG. 2, in a first method of use, device 10 is used to restrain a load 40 having a sharp exterior corner 42. There are many types of loads having corners that are sharp enough to gradually cut their way through a strap. For example, steel plate may have sharp exterior corners. Interior corners 18 (FIGS. 1A-1B) and 24 are fit over exterior corner 42 and a strap 44 is threaded under pin 26 (that is between pin 26 and load 40), over pin 20 (so that pin 20 is between strap 44 and load 40) and then under pin 28. It may be appreciated that in a shift restraint that is not open on one side as is device 10, a user might have to work the restraint over to where it is needed, along strap 44, whereas with device 10, a user may simply place it close to a desired place along strap 44. Device 10 preserves strap 44 from the cutting effect of the corner 42 as well as restraining load 40.

Figure 3:
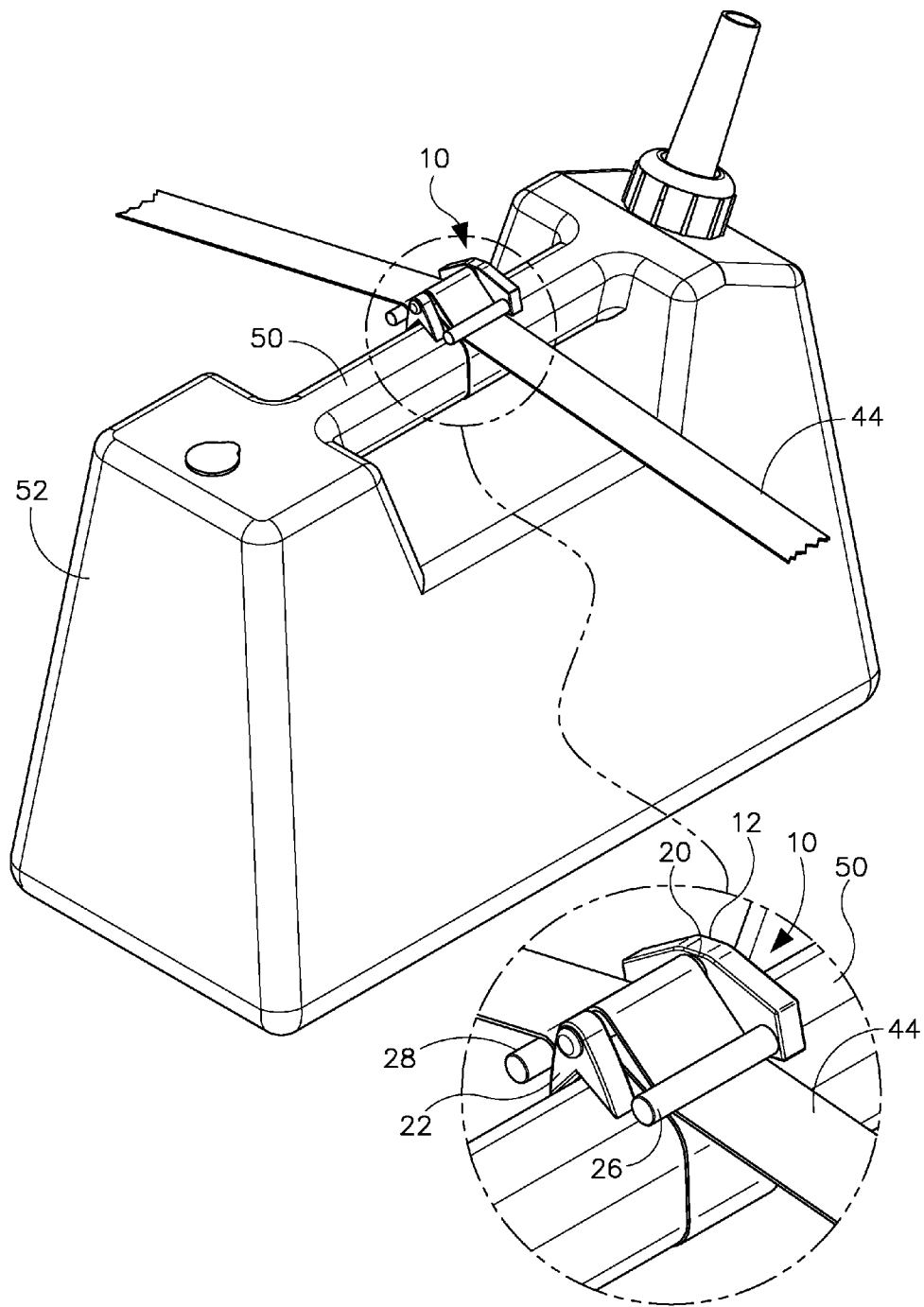
FIG. 3 is a perspective view of the device of FIG. 1a, being used to restrain a load having a handle.

Referring, now, to FIG. 3, device 10 permits a user to loop around a handle 50 on a load 52. If not equipped with a device such as 10, a user may loop a strap around a handle, but of course cannot do so without the strap conflicting with its own presence, causing not a neat loop, but one which extends along the handle in a short helix. It can be appreciated that this arrangement is not as secure as that shown in FIG. 3. In this arrangement, the strap 44 extending under pin 26, over pin 20, back under pin 20, around handle 50, and then under and about pin 28, before extending outwardly. Accordingly, a loop is formed about handle 50, made up of strap 44 and device 10, with base plate 12 and end plate 22 resting on handle 50. In an alternative preferred embodiment, corners 18 and 24 are rounded or simply replaced with parallel arcs or parallel curves of some other sort. Device 10 is preferably made of steel. Base plate 12 does not have to have flat sides, it is only important that it adequately supports pins 20, 26 and 28 which are anchored deep in plate 12.

In one method of manufacturing, pins 20, 26 and 28 are welded to base plate 12 and end plate 24 is welded to central pin 20. In another method, pins 20, 26 and 28 are swaged, and in yet another they are attached with epoxy. Heat treated steel 4140 is used in one embodiment, and in another 8620 steel is used and case hardened. In yet another embodiment, stainless steel is used.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A load restraint device, comprising:
    (a) a base plate having a center and a first wing and a second wing extending outwardly from the center, at about a right angle from each other, said wings defining a space between said wings;
    (b) a central pin, rigidly attached to said center of said base plate and extending outwardly in a direction perpendicular to said base plate, and having a rounded surface, facing away from said space between said wings;
    (c) a first side pin, attached to said first wing and a second side pin attached to said second wing, said side pins extending parallel to said central pin and each having distal free ends and a rounded portion facing said space between said wings;
    (d) an end plate having a center rigidly attached to said central pin and two end plate wings, defining a space between said end plate wings, that is aligned to said space between said wings but smaller, because said end plate wings are abbreviated compared to said base plate wings, said end plate being parallel to said base plate, a first strap space existing between said end plate and said distal free end of said first side pin and a second strap space existing between said end plate and said distal free end of said second side pin;
    (e) whereby a user can place said device on a load and can thread a strap through said first strap space and said second strap space so that it extends between said load and said side pins, and over said central pin so that said central pin is between said strap and said load, thereby retaining said load while the strap contacts only rounded surfaces.

2. The load restraint device of claim 1, wherein said central pin is round.

3. The load restraint device of claim 1, wherein said side pins are round.

4. The load restraint device of claim 1, wherein said base plate has flat side surfaces.

5. The load restraint of claim 1, wherein said wings define an interior corner, whereby said exterior corner of said load can be fit into said interior corner.

6. The load restraint of claim 1, further being made of steel, and wherein said pins are welded to said base plate.

7. A method of restraining a load, comprising:
    (a) providing a load restraint, having:
        (i) a base plate having a center and a first wing and a second wing extending outwardly from the center, at about a right angle from each other, said wings defining a space between said wings;
        (ii) a central pin, rigidly attached to said center of said base plate and extending outwardly in a direction perpendicular to said base plate, and having a rounded surface, facing away from said space between said wings;
        (iii) a first side pin, attached to said first wing and a second side pin attached to said second wing, said side pins extending parallel to said central pin and each having distal free ends and a rounded portion facing said space between said wings;
        (iv) an end plate having a center rigidly attached to said central pin and two end plate wings, defining a space between said end plate wings, that is aligned to said space between said wings but smaller, because said end plate wings are abbreviated compared to said base plate wings, thereby leaving a space between said end plate wings and both said distal free ends of said first side pin and said second side pin, said end plate being parallel to said base plate; and
    (b) placing said load restraint on said load and threading a tension member through said pins, by way of said spaces between said end plate and said distal free ends of said side pins, so that said tension member extends between said side pins and said load and over said center pin, so that said center pin is between said tension member and said load.

8. The method of claim 7, wherein said central pin is round.

9. The method of claim 7, wherein said side pins are round.

10. The method of claim 7, wherein said base plate has flat side surfaces.

11. The method claim 7, wherein said wings define an interior corner, wherein said load includes an exterior corner and wherein placing said load restraint on said load more specifically includes placing said interior corner of said load restraint over said exterior corner of said load.

12. The method of claim 7, wherein said load includes a handle and wherein said tension member is placed between said first side post and said handle, over said center post, back between said first side post and said handle, around a portion of said handle and between said second side post and said handle, and outward, for form a loop about said handle that includes said tension member and said load restraint, in order to hold said load in place by said handle.

13. The method of claim 12, wherein said strap is placed by being slid on to said load restraint, sideways.

14. The method of claim 7, wherein said tension member is a strap.

15. The method of claim 7, wherein said tension member is threaded onto said device prior to said device being placed on said load.

* * * * *